Figure 1:
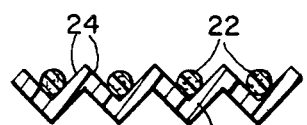

United States Patent [19]

Slaughter et al.

[11] 4,199,225
[45] Apr. 22, 1980

[54] OPTICAL GUIDES

[75] Inventors: Raymond J. Slaughter, Chiselhurst; Derek Chadwick, Stretford, both of England

[73] Assignee: BICC Limited, London, England

[21] Appl. No.: 894,345

[22] Filed: Apr. 7, 1978

[51] Int. Cl.² ............................................. G02B 5/14
[52] U.S. Cl. ............................................. 350/96.23
[58] Field of Search ................................... 350/96.23

[56] References Cited
U.S. PATENT DOCUMENTS

| | | | |
|---|---|---|---|
| 3,883,218 | 5/1975 | Slaughter | 350/96.23 |
| 4,078,853 | 3/1978 | Kempf et al. | 350/96.23 |
| 4,089,585 | 5/1978 | Slaughter et al. | 350/96.23 |
| 4,110,001 | 8/1978 | Olszewski et al. | 350/96.23 |

FOREIGN PATENT DOCUMENTS

| | | | |
|---|---|---|---|
| 1479426 | 7/1977 | United Kingdom | 350/96.23 |
| 1480206 | 7/1977 | United Kingdom | 350/96.23 |

*Primary Examiner*—Stewart J. Levy
*Attorney, Agent, or Firm*—Buell, Blenko & Ziesenheim

[57] ABSTRACT

An optical cable comprises an extruded elongate body of rubber or plastics material having at least one bore extending lengthwise in the body, and, embedded in the extruded elongate body and arranged side-by-side with the bore or bores, at least one separate elongate reinforcing member, at least one substantially flat flexible support member, e.g. a flexible tape or a pair of overlying flexible tapes, is housed loosely in the bore or in at least one of the bores and, viewed in transverse cross section, the tape or at least one of the tapes is corrugated so that it has a plurality of troughs extending along its length, at least two optical bundles or optical fibers are secured in at least two of the troughs.

17 Claims, 4 Drawing Figures

OPTICAL GUIDES

This invention relates to optional guides for the transmission of the ultra-violet, visible and infra-red regions of the electromagnetic spectrum, which regions, for convenience, will hereinafter all be included in the generic term "light" and especially, but not exclusively, to optical waveguides for use in the communications field adapted for transmission of light having a wavelength within the range 0.8 to 1.3 micrometers.

According to the present invention, an improved optical cable comprises an extruded elongate body of rubber or plastics material having at least one bore extending lengthwise in the body; at least one substantially flat flexible support member comprising at least one flexible tape which is housed loosely in the bore or in at least one of the bores and which, viewed in transverse cross section, is corrugated so that it has a plurality of troughs extending along its length; at least two flexible optical guides secured in at least two of said troughs; and, embedded in said extruded elongate body and arranged side-by-side with said bore or bores, at least one separate elongate reinforcing member.

Each flexible optical guide may be a separate optical fibre or it may be an optical bundle. By the expression "optical bundle" is meant a group of optical fibres or a group of fibres including one or more optical fibres and one or more non-optical reinforcing fibres or other reinforcing elongate elements. Each optical fibre and/or non-optical fibre may be of circular or non-circular cross-section.

Since the substantially flat flexible support member on or within which the or each optical bundle and/or separate optical fibre is secured is housed loosely in a bore extending lengthwise in the extruded elongate body, limited relative movement between the flexible support member and the extruded elongate body—and hence between the or each optical bundle and/or the or each separate optical fibre and the extruded elongate body—can take place when the cable is flexed.

By virtue of the fact that the position of each optical bundle and/or each separate optical fibre secured on or within the flexible support member with respect to the other optical bundle or bundles and/or other separate optical fibre or fibres is constant throughout the length of the cable, any optical bundle and/or separate optical fibre can be readily identified at any transverse cross-section of the cable. Furthermore, since each optical bundle and/or each separate optical fibre is secured on or within a flexible support member, feeding of the optical bundles and/or optical fibres in the bore or bores of the extruded elongate body during manufacture of the cable, and especially when initially introducing the optical bundles and/or optical fibres into the bore or bores, is facilitated.

Where the extruded elongate body has a transverse cross-sectional shape of such a form that the parts of the body on opposite sides of a plane passing through the axis or axes of the bore or bores are substantially identical, preferably initial identification of the optical bundles and/or optical fibres is further facilitated by providing a longitudinally extending datum mark on the surface of the extruded elongate body.

Preferably, the or each tape is made of paper or plastics material, of glass or of metal or metal alloy. In some circumstances, it is preferred that the or each tape is of a material having a coefficient of thermal expansion approximating to that of the material or materials of the optical fibres. For example, where the optical fibres are of a silica-based material, the or each tape may be of steel.

The flexible support member may consist of two tapes, one overlying the other, and in this case one or each of these two tapes may be transversely corrugated as described above with at least two optical bundles and/or separate optical fibers housed in at least two of the troughs. The two tapes may be so bonded together that the optical bundles and/or separate optical fibers are secured within the flexible support member so formed but are capable of limited movement within the troughs in which they lie.

As a further means of initially identifying any optical bundle and/or separate optical fibre secured side-by-side on or within at least one substantially flat flexible support member, the support member may carry a longitudinally extending datum mark on its surface and/or at least one of the optical bundles and/or optical fibres may be assymmetrically positioned with respect to the or each other optical bundle and/or optical fibre so that it constitutes a longitudinally extending datum.

Preferably, the or each bore extends substantially parallel to the axis of the extruded elongate body and the or each elongate reinforcing member is substantially parallel to the bore or bores, the axes of the bore or bores and of the reinforcing member or members lying in a substantially common plane. Where the optical cable includes two or more elongate reinforcing members, the or each bore or at least two bores may be located between two reinforcing members. The or each bore may lie wholly in the space bounded by two planes located on opposite sides of two reinforcing members and touching both members so that the optical fibres are protected by the reinforcing members against crushing.

Preferably, where the optical cable includes two separate reinforcing members embedded in the extruded elongate body and arranged on opposite sides of and substantially parallel to the bore with their axes and the axis of the bore lying in a substantially common plane, the transverse cross-section of the extruded elongate body is such that, over that part of the cable extending between planes substantially perpendicular to said common plane and passing through the axes of the reinforcing members, the width of the body is substantially less than the width of the body measured in said perpendicular planes.

The or each bore may be of any transverse cross-sectional shape but preferably the cross-sectional shape of the or each bore is of an elongate form with the or each flexible support member so housed loosely in the bore that the axes of the optical bundles and/or separate optical fibres lie in a plane or planes that is or are parallel or approximately parallel to the major transverse dimension of the bore.

The or each reinforcing member is of such a material and of such a cross-sectional area having regard to the material or materials and cross-sectional area of the optical bundle or bundles and/or of the separate optical fibre or fibres that the strain otherwise imparted to the or each optical fibre when the cable is stressed in such a way as to tend to subject the or any optical fibre to a tensile force is eliminated or reduced at least to a substantial extent by the reinforcing member or members.

The or each elongate reinforcing member may be a single solid element or, with a view to making the optical cable as flexible as possible, the or each reinforcing member may comprise a plurality of elements stranded together. The or each element is preferably of steel, carbon fibre or any other suitable material having the necessary Young's Modulus.

Figure 2:
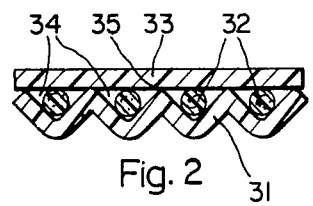
Figure 3:
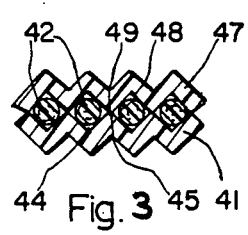
Figure 4:
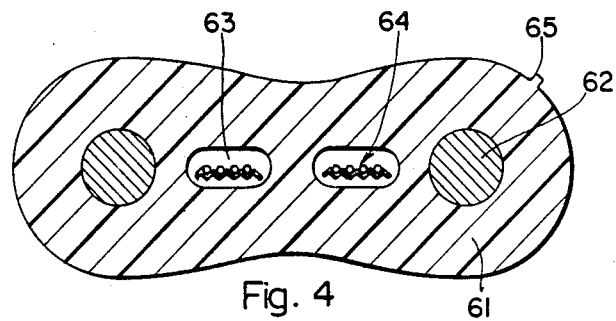

The invention is further illustrated by a description, by way of example, of three optical fiber arrays for incorporation in an optical cable and or a preferred form of optical cable, with reference to the accompanying drawing, in which:

FIGS. 1–3 show diagrammatic transverse cross sectional views of the three optical fiber arrays, and FIG. 4 shows a similar view of the preferred form of optical cable.

The optical fibre arrays shown in FIGS. 1 to 3 are drawn on a greatly enlarged scale to clarify their structure. The array shown in FIG. 1 comprises a flexible plastics tape 21 which, viewed in transverse cross-section, is so corrugated that it has a plurality of troughs 24 extending along its length in each of which an optical fibre 22 is secured by adhesive. The array shown in FIG. 2 differs from that shown in FIG. 1 in that optical fibres 32 secured by adhesive in the troughs 34 of a flexible corrugated plastics tape 31 are also secured by adhesive to a major surface of a flexible plastics tape 33 which effectively closes the troughs 34 and is secured by adhesive to the peaks 35 defining the troughs. In the array shown in FIG. 3, optical fibres 42 are sandwiched between, and secured by adhesive in the troughs 44, 48 of, two flexible corrugated plastics tapes 41, 47 whose peaks 45, 49 are secured together by adhesive.

The optical cable shown in FIG. 4 is drawn on a smaller scale than the optical fibre arrays shown in FIGS. 1 to 3. The optical cable shown in FIG. 4 comprises an extruded plastics elongate body 61 of dumbbell shaped cross-section in which two steel reinforcing wires 62 are embedded on opposite sides of two bores 63, each of an elongate transverse cross-section, the axes of the bores and reinforcing wires lying in a common plane. Loosely housed in each bore 62 is an optical fibre array 64 similar to that illustrated in FIG. 3. The external surface of the body 61 carries a longitudinally extending rib 65 to provide for ready identification of any optical fibre of the arrays 64.

What we claim as our invention is:

1. An optical cable comprising an extruded elongate body of rubber or plastics material having at least one bore extending lengthwise in the body; at least one substantially flat flexible support member comprising at least one flexible tape which is housed loosely in the bore or at least one of the bores and which, viewed in transverse cross section, is corrugated so that it has a plurality of troughs extending along its length; at least two flexible optical guides secured in at least two of said troughs; and, embedded in said extruded elongate body and arranged side-by-side with said bore or bores, at least one separate elongate reinforcing member.

2. An optical cable as claimed in claim 1, wherein the or each reinforcing member comprises a plurality of elements stranded together.

3. An optical cable as claimed in claim 1, wherein the flexible support member is of a metal or metal alloy.

4. An optical cable as claimed in claim 1, wherein the flexible support member is of paper.

5. An optical cable as claimed in claim 1, wherein the flexible support member is of plastics material.

6. An optical cable as claimed in claim 1, wherein the flexible support member is of a material having a coefficient of thermal expansion approximating to that of the material or materials of the optical guides secured to the member.

7. An optical cable as claimed in claim 6, wherein the optical guides are of a silica-based material and the support member is of steel.

8. An optical cable as claimed in claim 1, wherein at least one of the flexible optical guides is a separate optical fibre.

9. An optical cable as claimed in claim 1, wherein at least one of the flexible optical guides is an optical bundle.

10. An optical cable as claimed in claim 1, wherein the surface of the extruded elongate body carries a longitudinally extending datum mark for facilitating initial identification of the optical guides.

11. An optical cable as claimed in claim 1, wherein the cross-sectional shape of the or each bore is of an elongate form with the flexible support member so loosely housed in the bore that the axes of the optical guides lie in a plane that is approximately parallel to the major transverse dimension of the bore.

12. An optical cable as claimed in claim 1, wherein the or each bore extends substantially parallel to the axis of the extruded elongate body and the or each elongate reinforcing member is substantially parallel to the bore or bores, the axes of the bore or bores and of the reinforcing member or members lying in a substantially common plane.

13. An optical cable as claimed in claim 12 in which the optical cable includes at least two elongate reinforcing members, wherein the or each bore is located between two reinforcing members.

14. An optical cable as claimed in claim 13, wherein the or each bore lies wholly in the space bounded by two planes located on opposite sides of two reinforcing members and touching both members.

15. An optical cable as claimed in claim 14, wherein the transverse cross-section of the extruded elongate body is such that, over that part of the cable extending between planes substantially perpendicular to said common plane and passing through the axes of the reinforcing members, the width of the body is substantially less than the width of the body measured in said perpendicular planes.

16. An optical cable comprising an extruded elongate body of rubber or plastics material having at least one bore extending lengthwise in the body; at least one substantially flat flexible support member comprising two overlying flexible tapes which are secured together and housed loosely in the bore or in at least one of the bores, at least one of said two tapes, viewed in transverse cross section, being so corrugated that it has a plurality of troughs extending along its length; at least two flexible optical guides sandwiched between said tapes and secured in at least two of said troughs and, embedded in said extruded elongate body and arranged side-by-side with said bore or bores, at least one separate elongate reinforcing member.

17. An optical cable comprising an extruded elongate body of rubber or plastics material having at least one bore extending lengthwise in the body; at least one substantially flat flexible support member comprising two overlying flexible tapes which are bonded together and housed loosely in the bore or in at least one of the bores, at least one of which tapes, viewed in transverse cross section, being so corrugated that it has a plurality of troughs extending along its length; at least two flexible optical guides housed in at least two of said troughs in such a way that they are secured within the flexible support member but are capable of limited movement within the troughs in which they lie; and, embedded in said extruded elongate body and arranged side-by-side with said bore or bores, at least one separate elongate reinforcing member.

* * * * *